Figure 1:
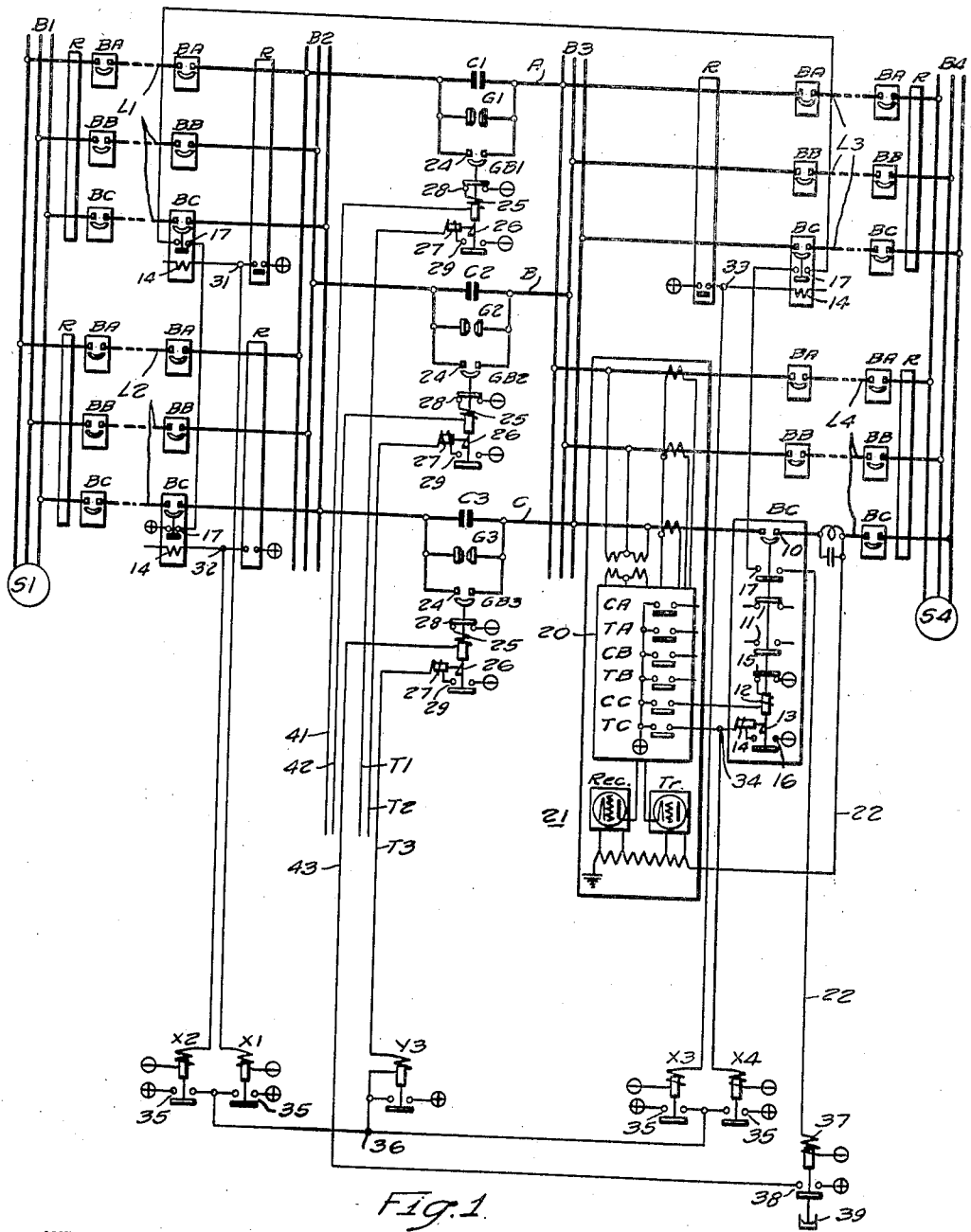

April 4, 1944.    R. D. EVANS    2,345,924
SERIES-CAPACITOR SINGLE-POLE SWITCHING
Filed April 23, 1943    2 Sheets-Sheet 1

WITNESSES:
E. A. McCloskey
Wm. C. Groome

INVENTOR
Robert D. Evans.
BY O. B. Buchanan
ATTORNEY

Patented Apr. 4, 1944

2,345,924

UNITED STATES PATENT OFFICE 2,345,924

SERIES-CAPACITOR SINGLE-POLE SWITCHING

Robert D. Evans, Swissvale, Pa., assignor to Westinghouse Electric & Manufacturing Company, East Pittsburgh, Pa., a corporation of Pennsylvania Application April 23, 1943, Serial No. 484,161

17 Claims. (Cl. 171—97)

My invention relates to transmission-line stability, and it has particular relation to single-phase series capacitors which are switched into the sound line-conductors which are in parallel to the faulted phase-conductor or conductors of a multi-circuit three-phase transmission system in the event of a fault involving one, two or three phases, as the case may be, the series capacitor being added only in the phase or phases affected by the fault, and preferably in an amount sufficient to leave the phase-impedance of the line unchanged after the switching-operation which is necessary to remove the fault.

My invention is an improvement over several expedients which have been known heretofore.

Single-pole switching has been known, as covered by a Goldsborough application Serial No. 424,957, filed December 30, 1941, patented June 1, 1943, No. 2,320,861, and assigned to the Westinghouse Electric & Manufacturing Company, in which fast-reclosing single-pole fault-segregating breakers have been utilized, with suitable selective relaying-means for properly selecting the faulted phase or phases, so as to leave the line transmitting power over the unfaulted phase or phases while clearing a fault involving less than all of the phases. In this way, significant amounts of power have been transmitted during the rapid opening and reclosing of the breakers necessary to clear the fault, thus enabling the system to ride through more severe fault-disturbances, or at heavier system-loading, without loss of synchronism.

Quickly-restored, gap-protected series-capacitors have also been known, as covered by an application of Marbury, Montieth and myself, Serial No. 445,562, filed June 3, 1942, in which the power-limits of a transmission-system, during its normal, fault-free operation, have been extended by neutralizing some of the line-reactance with limited-voltage series-capacitors, which, because of their limited voltage-rating, had to be protected by protective-gap devices which are operative during fault-conditions to protect the series-capacitors against the overvoltages caused by the fault-current. A significant feature of the series-capacitor invention just mentioned, is that any series-capacitor which is shunted out of service by its protective gap during fault-conditions is quickly restored into service at the subsidence of the fault-current after the fault-clearing breaker-operation, so that the series-capacitors will be effective to assist the line in riding through dangerous transient which always immediately follows a fault-clearing breaker-operation, so as to prevent unnecessary loss of synchronism.

A variable series-capacitor system has also been known, as covered in an application of Montieth and myself, Serial No. 446,078, filed June 6, 1942, in which series-capacitors (or additional series-capacitors) are inserted in each phase of a 3-phase transmission system in response to a switching-operation which tends to increase the inductive reactance of the line, the inserted series-capacitors being utilized to neutralize the increment in the effective line-reactance, so that the power-angle of the line, corresponding to the amount of power being transmitted, is approximately the same, before and after the switching-operation, or is otherwise related in such manner as to minimize the probability of the loss of synchronism. In this variable-capacitor system, the series-capacitors have been inserted, either as a result of a circuit-change involving the removing (or switching out) of one of a plurality of parallel-connected generators from the system, or as a result of a circuit-change involving the removing (or switching out) of one of a plurality of parallel-connected line-sections which may have become faulted. In the latter event, even though the fault involved only a single phase, and even though single-pole switching was utilized, the three series-capacitors, in the three line-phases, were all switched in or out simultaneously. In the event of a single-pole switching-operation involving less than all three phases, it was contemplated that the switched-out phases would be quickly restored to service again. In the event of a non-clearing single-phase fault which prevented the restoration of the faulted phase to service, it was contemplated that all three phases of the affected line-section would be permanently switched out of service, and that the system would continue to operate on the remaining parallel-connected line or lines, with the additional 3-phase series-capacitance connected in service to compensate for the increase in the line-reactance.

In accordance with my present invention, I provide a single-pole switching-system which does not need to be fast-reclosing, thus providing a sectionalized multiple-circuit three-phase synchronous transmission-system which may, in fact, operate permanently with one or more phase-conductors of a line-section or line-sections out of service. This result is accomplished by means of single-pole series-capacitor switching-operations which introduce the series-capacitance only in the line-phase or phases in which one or more of the parallel-connected line-conductors have been switched out of service as a result of a single-pole fault-responsive switching-operation. Preferably, the value of the series-capacitor reactance is chosen so as to make the total impedance of the three phases of the line the same, irrespective of whether one, two or three phases of any one or more of the parallel-connected line-sections are removed from service by the fault-clearing line-sectionalizing breaker-operation.

My present arrangement thus does not require high-speed reclosing of the line-sectionalizing breakers in order to maintain stability, and it permits sustained operation with one phase, or even all of the phases, of a line-circuit out of service. In addition, my system minimizes the unbalances due to unequal voltage-drops which would otherwise be encountered during the time when a single phase-conductor of the line was out of service. If automatic reclosure of the single-pole line-sectionalizing breakers is utilized, normal breaker-closing times may be utilized, without the necessity for resorting to the costly breaker-construction which is needed in order to obtain very high-speed reclosure.

Figure 2:
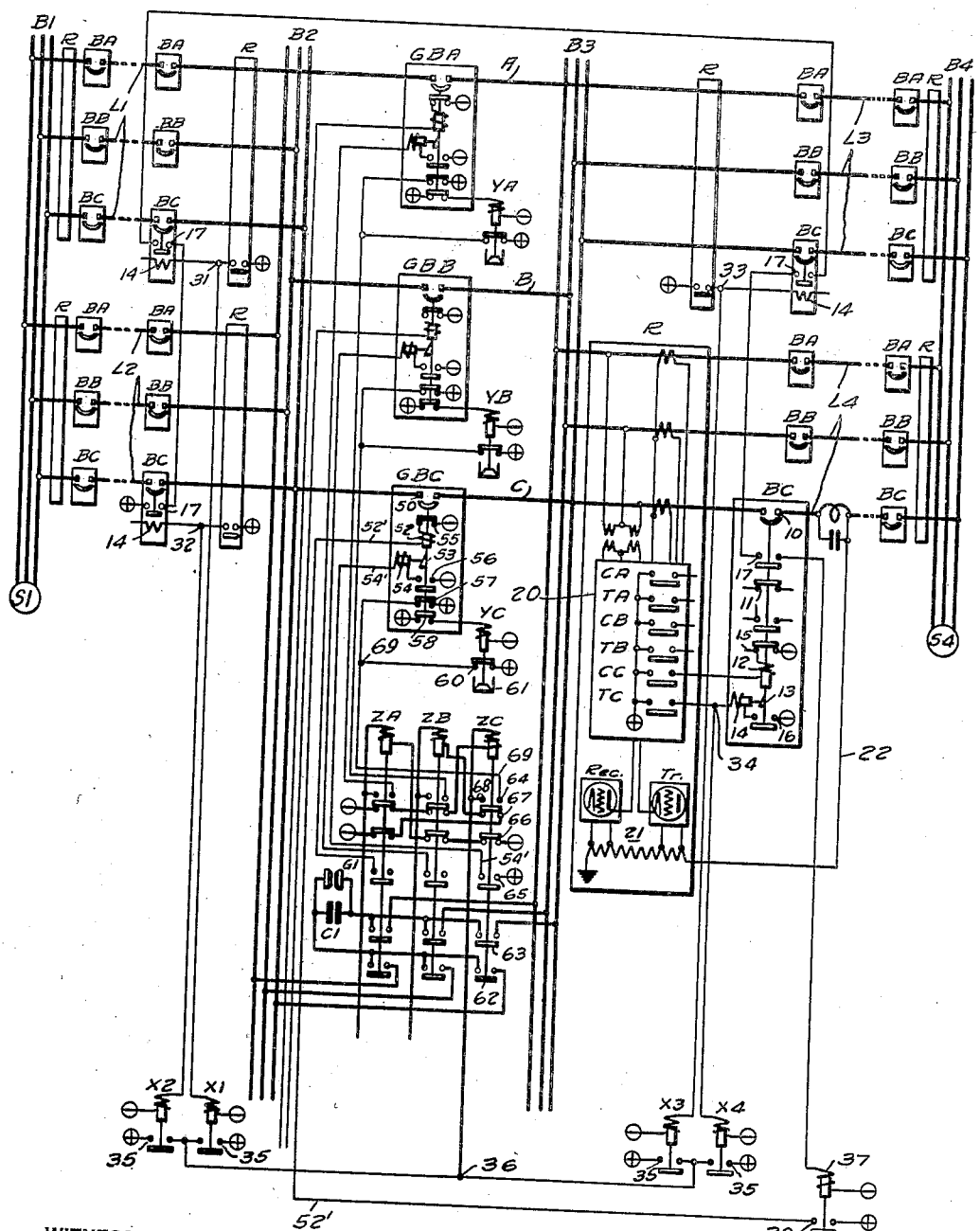

With the foregoing and other objects in view, my invention consists in the novel elements, parts, combinations, systems, and methods hereinafter described and claimed, and illustrated in the accompanying drawings, wherein:

Figure 1 is a diagrammatic view of circuits and apparatus illustrating a preferred form of embodiment of my invention, and Fig. 2 is a similar view showing a modification in which only one series capacitor is utilized, with switching-means for quickly inserting it in the faulted phase in the event of a fault requiring the removal of only one of the phases of one of the line-sections from service.

In Fig. 1, I have illustrated my invention as being applied to a sectionalized 3-phase, 60-cycle, high-voltage, synchronous, 2-circuit transmission-system, feeding power from a generator-bus B1 to a relatively infinite receiver-bus B4, through four 3-phase line-sections L1, L2, L3 and L4, which are bussed together, in serially connected pairs, through four 3-phase buses B1, B2, B3 and B4. The buses B1 and B2 are joined by the line-sections L1 and L2, while the buses B3 and B4 are joined by the line-sections L3 and L4. The generator-bus B1 and the receiver-bus B4 are illustrated as having synchronous machines S1 and S4, respectively, connected thereto, it being understood that any number of synchronous machines would be connected to each bus, and that the connections might, or might not (usually would) include step-up transformers between the synchronous machines and the buses.

Each of the four line-sections L1, L2, L3 and L4 is connected to its bus by suitable circuit-interrupting means, which are illustrated as single-pole or single-phase breakers BA, BB and BC, one for each phase, said breakers being controlled in each case, by suitable relaying-apparatus R. As these equipments may all be similar, only one is shown in any detail.

The two intermediate buses B2 and B3 have their respective phase-conductors A, B and C joined by the series-capacitors C1, C2 and C3, respectively, each capacitor being provided with a suitable protective-gap equipment G1, G2 and G3, respectively, and each series-capacitor being normally short-circuited by its corresponding gap-shunting breaker GB1, GB2 and GB3, respectively. Thus, for example, the phase-connection C between the phase-C conductor of the buses B2 and B3 is normally completed through the gap-breaker GB3, so that the corresponding series-capacitor C3 is shunted out of service. It will be understood that similar connections are made for the other two phases A and B.

The line-sectionalizing circuit-breakers BA, BB and BC may be described with reference to the detailed phase-C breaker BC between the line-section L4 and the bus B3. Said breaker has main contacts 10, one or more auxiliary breaker-switches 11 for relay-circuit controls of various natures, a closing-coil 12, and an opening-mechanism comprising a latching-device 13 and a trip-coil 14. The closing-coil 12 is in series with an auxiliary breaker-switch 15 for deenergizing the coil when the breaker is closed. The trip-coil 14 is in circuit with an auxiliary breaker-switch 16 for deenergizing the coil when the breaker is open. The breaker is also provided with an auxiliary breaker-switch 17 which is closed when the breaker is closed, and which is utilized in my novel control-system as will be subsequently described.

The line relays R are typified by the relay R for the B3 end of the line-section L4. This relaying-equipment R consists of a current- and voltage-energized panel 20, including tripping-contacts TA, TB and TC, one for each phase, and closing-contacts, CA, CB and CC, one for each phase, these contacts being suitably controlled, either for single-pole tripping, or multiple-pole tripping involving either two or three poles of the circuit-breakers BA, BB and BC at each relaying point. The relaying-apparatus R usually also includes a carrier-current transmitter and receiver-set 21, which is suitably coupled to the protected line-section, as shown at 22, for the purpose of enabling the relay to discriminate according to the fault-conditions at the other end of the protected line-section.

Each of the series-capacitors C1, C2 and C3 consists of a large bank of capacitors, usually rated at tens of thousands of volts and tens of thousands of kva. per phase, depending, of course, upon the value of the inductive line-reactance to be neutralized. The protective-gaps G1, G2 and G3, shunting the respective capacitors C1, C2 and C3, are intended to be symbolic of more or less elaborate gap-structures, and associated equipment, designed to quickly operate to protect the respective capacitors against excessive voltages appearing thereacross, while at the same time permitting the capacitors to be quickly restored to service after the passage of the excess-current condition which caused the excessive voltage to start to appear across the capacitors.

The capacitor-shunting gap-breakers GB1, GB2 and GB3 are all alike. Each comprises main contacts 24, a closing-coil 25, and an opening-mechanism comprising a latching-device 26 and a trip-coil 27. The closing-coil 25 and the trip-coil 27 are respectively in circuit with auxiliary breaker-switches 28 and 29, respectively, for opening the coil-circuits when the breaker has completed its movement.

In accordance with my present invention, I provide a separate control for each of the capacitor-shunting gap-breakers GB1, GB2 and GB3, one control for each phase. For simplicity of illustration, I have detailed only the phase-C control, for controlling the gap-breaker GB3; the other two gap-breakers GB1 and GB2 being similarly controlled from phases A and B, as will be readily understood.

The three gap-breakers GB1, GB2 and GB3 are normally closed, in the normal operating-condition of the transmission-system, and one of these gap-breakers is tripped open, whenever the corresponding phase of any one of the four line-sections L1, L2, L3 and L4 is tripped open for fault-clearing purposes. By reason of the carrier-current equipment 21, it is possible to simultaneously energize the trip-coils 14 of the line-sectionalizing breakers BA, BB or BC at both ends of the faulted phase-conductor in any one of the four line-sections, so that the beginning of the tripping-operation of any one of the line-sectionalizing breakers which are connected to either one of the intermediate buses B2 and B3 may be made the signal for energizing the trip-coil 27 of the gap-breaker GB1, GB2 or GB3 in the same phase.

The phase-C tripping-connections for the phase-C gap-breaker GB3 are shown in detail, and these are intended to be representative of the tripping-control means for the other two gap-breakers GB1 and GB2, which are controlled from the phase-A and phase-B circuits, respectively. The tripping-circuits of the four phase-C line-sectionalizing breakers BC, two of which are connected at the B2 ends of line-sections L1 and L2, and two of which are connected at the B3 ends of line-sections L3 and L4, are tapped off, as indicated at 31, 32, 33 and 34, respectively, to energize the corresponding one of four auxiliary relays X1, X2, X3 and X4, whenever any one of the TC relay-contacts is closed for the purpose of completing a circuit to the trip-coil 14 of the corresponding breaker BC. Whichever one of the four auxiliary relays X1, X2, X3 or X4 is energized, immediately picks up and closes its contact 35, the four contacts 35 being connected in parallel with each other, between the positive bus (+) and a relaying-circuit conductor 36. This relaying-circuit conductor 36 is utilized to energize the trip-circuit T3 of the trip-coil 27 of the phase-C gap-breaker GB3, the connection usually being completed through a contactor-switch Y3 which seals in the connection until the breaker GB3 is opened, at which time the tripping-circuit is interrupted by the auxiliary breaker-switch 29.

It will be understood that similar controls will be provided, in the TA and TB trip-circuit relay-contacts, respectively, for the tripping-circuits T1 and T2 for the trip-coils 27 of the other two gap-breakers GB1 and GB2, respectively.

Since the normal condition of the system is for each phase-conductor of each of the four line-sections L1, L2, L3 and L4 to be in service, and for each phase of the capacitor-shunting gap-breakers GB1, GB2 and GB3 to be closed, I have provided means for responding to a closed condition of all four of the phase-C line-sectionalizing breakers BC which are connected to the two intermediate buses B2 and B3. To this end I provide an auxiliary relay 37, the operating coil of which is energized from the four auxiliary breaker-switches 17 of the aforesaid four circuit-breakers BC, with the four breaker-switches 17 connected in series, so that, when all four of these breakers are closed, the auxiliary relay 37 is energized, so as to pick up its make-contact 38, but preferably only after a time-delay which may be of the order of six cycles, as symbolized by a one-way-acting dash-pot 39.

It will be understood that, while only the phase-C auxiliary-relay 37 is shown, similar relays will be provided for the other two line-phases, so that suitable controls may be provided for the closing-coil circuits 41, 42 and 43 of the three gap-breakers GB1, GB2 and GB3. Only the phase-C circuits are detailed, which show the relay-contact 38 being utilized to energize the closing-coil circuit 43 of the closing-coil 25 of the phase-C gap-breaker GB3, so that said gap-breaker is closed in response to the closure of all four of the corresponding phase-C line-breakers BC at the intermediate relaying-station containing the intermediate buses B2 and B3.

In the normal operation of the system shown in Fig. 1, all of the circuit-breakers BA, BC, BB, GB1, GB2, and GB3 are closed, and power is transmitted from the bus B1 to the bus B4 through all three phases of all four line-sections L1, L2, L3 and L4, without any of the series-capacitors C1, C2 or C3 in service. When a fault occurs on any phase, such as phase-C, of any one of the four line-sections, such as the line-section L4, that fact is responded to by the closure of the appropriate trip-coil relay-contact TC, which not only energizes the trip-coil 14 of the corresponding line-breaker BC, but also energizes the relaying-circuit 34 which picks up the auxiliary relay X4 and energizes the trip-circuit T3 of the corresponding gap-breaker GB3. It is contemplated that the gap-breaker GB3 will open its main contacts 24 substantially immediately after the line-sectionalizing breaker BC opens its main contacts 10.

The opening of the main contacts 24 of the gap-breaker GB3 places the phase-C capacitor C3 in series with the sound phase-C conductor of the line-section L3 which parallels the faulted line-section L4, so that double current is carried by the sound phase-C conductor of the line-section L3. The reactance of the capacitor C is preferably so chosen that it neutralizes enough of the reactance of the phase-C line-conductor of the line-section L3 so that the effective reactance is the same as it was before the fault, with the two phase-C line-conductors of the sections L3 and L4 connected in parallel. Consequently, the transmission system is able to carry on, with balanced delivery of power, with any one, or two, or three, of the line-conductors of the various line-sections L1, L2, L3 and L4 out of service. Quick reclosure of the line-sectionalizing breakers, such as the BC breaker which is shown in detail, need not be resorted to, thus saving the expense of providing line-breakers which are not only quick to open but also quick to reclose.

It is contemplated, however, that eventually, either promptly, by automatic means, or by manual control, the affected line-breaker, such as BC, will be reclosed, either before or after ascertaining that the fault-condition has been cleared. For purposes of illustration, I have indicated a system in which the automatically responsive relay-panel 20 contains a closing-coil contact CC which is designed to automatically reclose the breaker BC, at least once, after the breaker has been opened in response to a fault, at least under certain conditions, depending upon the nature of the protective relaying system which is utilized.

When the breaker BC recloses, assuming that the other three BC line-breakers at the intermediate relaying station are already closed, the auxiliary relay 37 will be energized, but it will not immediately close its contact 38, but will delay for a predetermined time, which may be of the order of six cycles, or other time-interval for giving the breaker a chance to immediately trip open again, in case the fault should still remain on the same line-conductor. If, however, the BC line-breaker closes, and remains closed for the specified six cycles, or other time-setting of the time-delay means 39, the auxiliary-relay contact 38 will close, energizing the closing-circuit 43 of the corresponding gap-breaker GB3, thereby reclosing the gap-breaker, and thus restoring the system to its normal operating-condition.

It will be understood that the circuit-diagram shown in Fig. 1 has been very much simplified, for clarity of illustration of the general principles of my invention, without undertaking to show various control-details such as would be understood by those skilled in the art. It will be understood that any number of series-capacitors could be utilized, so as to take care of any number of parallel-connected line-sections being removed from service at the same time, within the operating limits of the particular transmission-system, only a simple system being illustrated. In like manner, it should be understood that an essential feature of the invention is that an individual series-capacitor is added in the particular line-phase or phases which is or are switched out of one of the parallel-connected line-sections because of a fault-condition; and while, for simplicity, I have illustrated a line in which normally there was no series-capacitance, my system is equally applicable to a line in which normally a certain amount of series-capacitance is connected in series with each of the line-phases, while, at times of faults, when one or more of the phases of a line-section may be switched out of service, additional series-capacitance will be connected into that particular phase or those particular phases which are affected by the fault-clearing switching-operation.

In any series-capacitor installation of the size or magnitude necessary for obtaining any reasonable amount of benefit from the standpoint of maintaining the stability or synchronous operation of a high-voltage transmission-system, the cost of the series-capacitors themselves constitutes a large proportion of the total cost of the installation. Each of the three series-capacitors C1, C2 and C3 may be an aggregate of 1000 or 2000 capacitor-tanks, each rated at 15 kva. at 2400 volts, for example. This represents a rather considerable investment in capacitor-units.

Because of the high cost of the capacitor-units, I have illustrated, in Fig. 2, an alternative form of embodiment of my invention, which is designed to take care of the condition of an outage of only one line-section phase-conductor at a time, whether it be only a single phase-conductor of only one of the parallel-connected line-sections L1 and L2, or only a single phase-conductor of only one of the parallel-connected line-sections L3 or L4. Thus, in Fig. 2, I have shown only one series-capacitor C1, with its parallel-connected protective-gap G1, in place of the three series-capacitors and gap-units C1, C2, C3 and G1, G2, G3 of Fig. 1.

Referring to Fig. 2, it will be observed that the equipment is identical with that which has been described for Fig. 1, except for the connecting-equipment which is utilized for connecting the phases A, B and C between the two intermediate buses B2 and B3, and the control-equipment which is directly associated therewith. This connecting-equipment, in Fig. 2, includes the single series-capacitor C1 which is normally unconnected from all three of the phases; the protective-gap equipment G1 which is permanently connected in parallel to the capacitor C1 and which is, of course, switched in and out simultaneously with the capacitor C1; three capacitor-controlling gap-breakers GBA, GBB and GBC which are normally connected in the respective phase-connections A, B and C between the two 3-phase buses B2 and B3; three auxiliary relays YA, YB and YC which are associated with the respective gap-breakers GBA, GBB and GBC; and three electrically controlled contactor-switches or disconnect-switches ZA, ZB and ZC which are utilized to connect the series capacitor C1 in any one of the three phases A, B and C, and to control the corresponding gap-breakers GBA, GBB or GBC of that phase.

The three gap-breakers GBA, GBB and GBC are typified by the phase-C breaker GBC, which is provided with main contacts 50, a closing-coil 52, a latching device 53, a trip-coil 54, auxiliary breaker-switches 55 and 56 in series with the closing-coil 52 and the trip-coil 54, respectively, and two additional auxiliary breaker-switches 57 and 58 which are closed when the breaker is open, and which are utilized in my control-system as subsequently described.

The three auxiliary relays YA, YB and YC are typified by the phase-C relay YC, which is provided with back-contacts 60, and slow-dropout means which is typified by a one-way-acting dashpot 61 for providing a brief hesitation, of perhaps a fraction of a cycle or more, in the drop-out movement of the relay.

The three contactor-switches ZA, ZB and ZC are typified by the phase-C contactor ZC, which is provided with two main contacts 62 and 63 for connecting the capacitor C1 to the phase-C conductor of the two buses B2 and B3, respectively, it being understood that the other two contactors ZA and ZB are utilized for making the connection to the phase-A and phase-B conductors, respectively. In addition to the two main contacts 62 and 63, the phase-C contactor ZC is provided with two auxiliary make-contacts 64 and 65, and two auxiliary back-contacts 66 and 67.

An energizing-connection is provided for the ZC contactor, in Fig. 2, from the previously described relay-circuit conductor 36 which is energized whenever any one of the four phase-C line-breakers BC is tripped, at the intermediate substation containing the buses B2 and B3. The energizing-circuit for the ZC coil may be traced, from the relay-circuit conductor 36, through the operating coil of the ZC relay or contactor, and thence through the auxiliary back-contacts 67 of the other two contactors ZA and ZB, so as to make sure that only one of the three contactors ZA, ZB or ZC may be energized at any time. As soon as the ZC coil is energized, the contactor picks up and closes its auxiliary make-contact 64 which closes a sealing-in or holding energizing-connection at 68, which connects the energizing-circuit 36, through the relay-contact 64, to a circuit 69 which is completed through the back-contact 60 of the auxiliary phase-C relay YC. It will be understood that the three gap-breakers GBA, GBB and GBC are all normally closed, so that the phase-C gap-breaker GBC is normally closed at this time, with its auxiliary breaker-switches 57 and 58 open.

When the phase-C contactor ZC picks up, it also closes its other auxiliary make-contact 65, which directly energizes the trip-circuit 54' of the trip-coil 54 of the phase-V gap-breaker GBC, thus causing said breaker to open, and thus inserting the series-capacitor CI in series with the conductor C which joins the phase-C conductors of the two buses B2 and B3.

As soon as the gap-breaker GBC opens, it closes its auxiliary switches 57 and 58. The auxiliary breaker-switch 57 completes the holding-circuit 69 of the contactor ZC, by-passing the contact 60 of the auxiliary relay YC. The auxiliary breaker-switch 58 energizes the auxiliary relay YC, and thus causes an opening of the back-contact 60 of the latter, but not before the auxiliary breaker switch 57 has closed and maintained the integrity of the holding-circuit 69, so that the contactor ZC remains energized, thus keeping the series-capacitor connected in service in the phase-C conductor of the transmission system.

Reclosing of the phase-C gap-breaker GBC of Fig. 2 is effected by means of the auxiliary relay 37 in the same manner which has been described in connection with Fig. 1. Thus, the relay-contact 38 of the auxiliary relay 37 directly energizes the closing-coil circuit 52' of the closing-coil 52 of the gap-breaker GBC, thus closing said breaker, and thus restoring it to its normal operating-condition. When the gap-breaker GBC recloses, it opens its auxiliary breaker-switches 57 and 58. The opening of the switch 58 deenergizes the auxiliary relay YC, and causes the back-contacts 60 of the latter to start to drop back toward their closed position, but, by reason of the time-delaying means 61, this contact-closing action is not completed, at 60, until the holding-circuit 69 has momentarily become broken at the auxiliary breaker-switch 57, so that the contactor ZC drops out before the auxiliary-relay back-contact 60 closes. The dropping out of the contactor ZC removes the series capacitor CI from the phase-C conductor, and restores the system to its normal operating condition, with the series-capacitor CI disconnected from all three phases of the transmission system.

While I have illustrated my invention in only two different forms of embodiment, and while I have illustrated it only in a very much simplified and somewhat idealized manner, for the sake of clarity and easy understandability, I wish it to be understood that my invention is susceptible of even further simplifications, as well as very considerably increased refinements of design and connection, and that it is applicable to almost an infinite variety of transmission-system connections, without departing from the essential spirit and purpose of the invention. I desire, therefore, that the appended claims shall be accorded the broadest construction consistent with their language.

I claim as my invention:

1. In a multi-circuit polyphase transmission-line having a plurality of parallel-connected line-conductors of each phase, and means for at times disconnecting less than all of the parallel-connected line-conductors of any phase or phases, the stability-increasing improvement comprising automatic means, operating substantially simultaneously with the means for disconnecting any line-conductor, for inserting capacitance in series with the remaining line-conductor or conductors of the same phase, for causing the total effective line-reactance of that phase to more nearly match the effective line-reactance of the other phases.

2. In a multi-circuit polyphase transmission-line having a plurality of parallel-connected line-conductors of each phase, and means for at times disconnecting less than all of the parallel-connected line-conductors of any phase or phases, the stability-increasing improvement comprising automatic means, cooperating selectively with each means for disconnecting any line-conductor of any phase, for selectively compensating, at least in part, for the increase in the effective line-reactance in that particular phase, as distinguished from the other phases, said automatic means comprising means for selectively inserting capacitance in series with the remaining line-conductor or conductors of that particular phase.

3. In a multi-circuit polyphase transmission-line having a plurality of parallel-connected line-conductors of each phase, and single-phase means for at times disconnecting a selected line-conductor of a selected phase, the stability-increasing improvement comprising phase-selective automatic means, operating substantially simultaneously with the means for disconnecting any line-conductor, for inserting capacitance in series with the remaining line-conductor or conductors of the same phase.

4. In a multi-circuit polyphase transmission-line having a plurality of parallel-connected line-conductors of each phase, and means for at times disconnecting less than all of the parallel-connected line-conductors of any phase or phases, the stability-increasing improvement comprising automatic means, becoming fully operative immediately after the means for disconnecting any line-conductor, for inserting capacitance in series with the remaining line-conductor or conductors of the same phase, for causing the total effective line-reactance of that phase to more nearly match the effective line-reactance of the other phases.

5. In a multi-circuit polyphase transmission-line having a plurality of parallel-connected line-conductors of each phase, and means for at times disconnecting less than all of the parallel-connected line-conductors of any phase or phases, the stability-increasing improvement comprising automatic means, cooperating selectively with each means for disconnecting any line-conductor of any phase, for selectively compensating, at least in part, for the increase in the effective line-reactance in that particular phase, as distinguished from the other phases, said automatic means comprising means, becoming fully operative immediately after the line-conductor disconnecting means, for selectively inserting capacitance in series with the remaining line-conductor or conductors of that particular phase.

6. In a multi-circuit polyphase transmission-line having a plurality of parallel-connected line-conductors of each phase, and single-phase means for at times disconnecting a selected line-conductor of a selected phase, the stability-increasing improvement comprising phase-selective automatic means, becoming fully operative immediately after the means for disconnecting any line-conductor for inserting capacitance in series with the remaining line-conductor or conductors of the same phase.

7. In a multi-circuit polyphase transmission-line having a plurality of parallel-connected line-conductors of each phase, and means for at times disconnecting less than all of the parallel-connected line-conductors of any phase or phases, the stability-increasing improvement comprising series capacitors in series with the several phase-conductors of the line, by-passing circuit-interrupters in shunt across the several series capacitors, said by-passing interrupters being normally closed in the normal operating-condition of the line, and automatic means, operating substantially simultaneously with the means for disconnecting any line-conductor, for causing an opening-operation of the by-passing interrupter or interrupters associated with the series capacitor or capacitors in the remaining line-conductor or conductors of the same phase, for causing the total effective line-reactance of that phase to more nearly match the effective line-reactance of the other phases.

8. In a multi-circuit polyphase transmission-line having a plurality of parallel-connected line-conductors of each phase, and means for at times disconnecting less than all of the parallel-connected line-conductors of any phase or phases, the stability-increasing improvement comprising series capacitors in series with the several phase-conductors of the line, by-passing circuit-interrupters in shunt across the several series capacitors, said by-passing interrupters being normally closed in the normal operating-condition of the line, and automatic means, cooperating selectively with each means for disconnecting any line-conductor of any phase, for selectively compensating, at least in part, for the increase in the effective line-reactance in that particular phase, as distinguished from the other phases, said automatic means comprising means for causing a selective opening-operation of the by-passing interrupter or interrupters associated with the aforesaid series capacitor or capacitors in the remaining line-conductor or conductors of only that particular phase.

9. In a multi-circuit polyphase transmission-line having a plurality of parallel-connected line-conductors of each phase, and single-phase means for at times disconnecting a selected line-conductor of a selected phase, the stability-increasing improvement comprising series capacitors in series with the several phase-conductors of the line, by-passing circuit-interrupters in shunt across the several series capacitors, said by-passing interrupters being normally closed in the normal operating-condition of the line, and phase-selective automatic means, operating substantially simultaneously with the means for disconnecting any line-conductor, for causing an opening-operation of the by-passing interrupter or interrupters associated with the series capacitor or capacitors in the remaining line-conductor or conductors of the same phase.

10. In a multi-circuit polyphase transmission-line having a plurality of parallel-connected line-conductors of each phase, and means for at times disconnecting less than all of the parallel-connected line-conductors of any phase or phases, the stability-increasing improvement comprising series capacitors in series with the several phase-conductors of the line, by-passing circuit-interrupters in shunt across the several series capacitors, said by-passing interrupters being normally closed in the normal operating-condition of the line, and automatic means, becoming fully operative immediately after the means for disconnecting any line-conductor, for causing an opening-operation of the by-passing interrupter or interrupters associated with the series capacitor or capacitors in the remaining line-conductor or conductors of the same phase, for causing the total effective line-reactance of that phase to more nearly match the effective line-reactance of the other phases.

11. In a multi-circuit polyphase transmission-line having a plurality of parallel-connected line-conductors of each phase, and means for at times disconnecting less than all of the parallel-connected line-conductors of any phase or phases, the stability-increasing improvement comprising series capacitors in series with the several phase-conductors of the line, by-passing circuit-interrupters in shunt across the several series capacitors, said by-passing interrupters being normally closed in the normal operating-condition of the line, and automatic means cooperating selectively with each means for disconnecting any line-conductor of any phase, for selectively compensating, at least in part, for the increase in the effective line-reactance in that particular phase, as distinguished from the other phases, said automatic means comprising means becoming fully operative immediately after the line-conductor disconnecting-means, for causing a selective opening-operation of the by-passing interrupter or interrupters associated with the aforesaid series capacitor or capacitors in the remaining line-conductor or conductors of only that particular phase.

12. In a multi-circuit polyphase transmission-line having a plurality of parallel-connected line-conductors of each phase, and single-phase means for at times disconnecting a selected line-conductor of a selected phase, the stability-increasing improvement comprising series capacitors in series with the several phase-conductors of the line, by-passing circuit-interrupters in shunt across the several series capacitors, said by-passing interrupters being normally closed in the normal operating-condition of the line, and phase-selective automatic means, becoming fully operative immediately after the means for disconnecting any line-conductor, for causing an opening-operation of the by-passing interrupter or interrupters associated with the series capacitor or capacitors in the remaining line-conductor or conductors of the same phase.

13. In a multi-circuit polyphase transmission-line having a plurality of parallel-connected line-conductors of each phase, and single-phase means for at times disconnecting a selected line-conductor of a selected phase, the stability-increasing improvement comprising a series-capacitor station comprising capacitor-controlling circuit-interrupters in series with the several phase-conductors of the line, said capacitor-controlling interrupters being normally closed in the normal operating-condition of the line, one or more normally disconnected capacitors, and automatic means, operating substantially simultaneously with the means for disconnecting any line-conductor, for first connecting a capacitor across a capacitor-controlling circuit-interrupter in another parallel-connected line-conductor of the same phase, and then opening said capacitor-shunted interrupter.

14. In a multi-circuit polyphase transmission-line having a plurality of parallel-connected line-conductors of each phase, and single-phase means for at times disconnecting a selected line-conductor of a selected phase, the stability-increasing improvement comprising a series-capacitor station comprising capacitor-controlling circuit-interrupters in series with the several phase-conductors of the line, said capacitor-controlling interrupters being normally closed in the normal operating-condition of the line, one or more normally disconnected capacitors, and automatic means, cooperating selectively with each means for disconnecting any line-conductor of any phase, for first connecting a capacitor across a capacitor-controlling circuit-interrupter in another parallel-connected line-conductor of the same phase, and then opening said capacitor-shunted interrupter.

15. In a multi-circuit polyphase transmission-line having a plurality of parallel-connected line-conductors of each phase, single-phase means for at times disconnecting a selected line-conductor of a selected phase, and means for subsequently reconnecting the disconnected line-conductor, the stability-increasing improvement comprising phase-selective means, responsive to said conductor-disconnecting means, for inserting capacitance in series with the remaining line-conductor or conductors of the same phase, and means, responsive to said conductor-reconnecting means, for removing said capacitance.

16. In a multi-circuit polyphase transmission-line having a plurality of parallel-connected line-conductors of each phase, single-phase means for at times disconnecting a selected line-conductor of a selected phase, and means for subsequently reconnecting the disconnected line-conductor, the stability-increasing improvement comprising series capacitors in series with the several phase-conductors of the line, by-passing circuit-interrupters in shunt across the several series capacitors, said by-passing interrupters being normally closed in the normal operating-condition of the line, phase-selective means, responsive to said conductor-disconnecting means, for causing an opening-operation of the by-passing interrupter or interrupters associated with the series capacitor or capacitors in the remaining line-conductor or conductors of the same phase, and means, responsive to said conductor-reconnecting means, for reclosing the opened interrupter or interrupters.

17. In a multi-circuit polyphase transmission-line having a plurality of parallel-connected line-conductors of each phase, single-phase means for at times disconnecting a selected line-conductor of a selected phase, and means for subsequently reconnecting the disconnected line-conductor, the stability-increasing improvement comprising a series-capacitor station comprising capacitor-controlling circuit-interrupters in series with the several phase-conductors of the line, said capacitor-controlling interrupters being normally closed in the normal operating-condition of the line, one or more normally disconnected capacitors, phase-selective means, responsive to said conductor-disconnecting means, for first connecting a capacitor across a capacitor-controlling circuit-interrupter in another parallel-connected line-conductor of the same phase, and then opening said capacitor-shunted interrupter, and means responsive to said conductor-reconnecting means, for first reclosing the opened interrupter, and then disconnecting the connected capacitor.

ROBERT D. EVANS.